Jan. 8, 1952 — W. F. LINSTEDT — 2,581,491
APPARATUS FOR SETTING-UP BOXES
Filed Nov. 26, 1943 — 9 Sheets-Sheet 1

Inventor
William F. Linstedt
By: Evans, Pond & Anderson Attys.

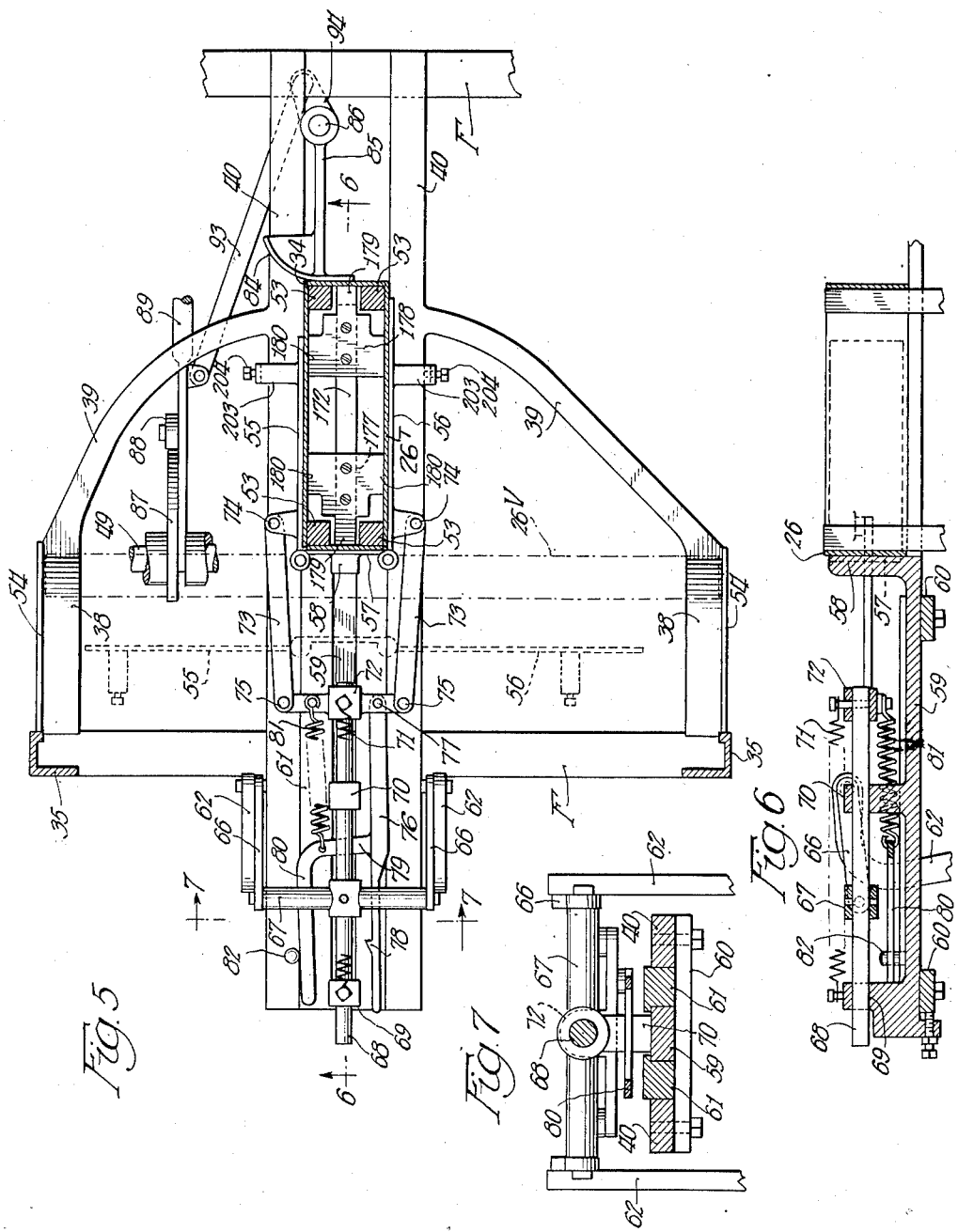

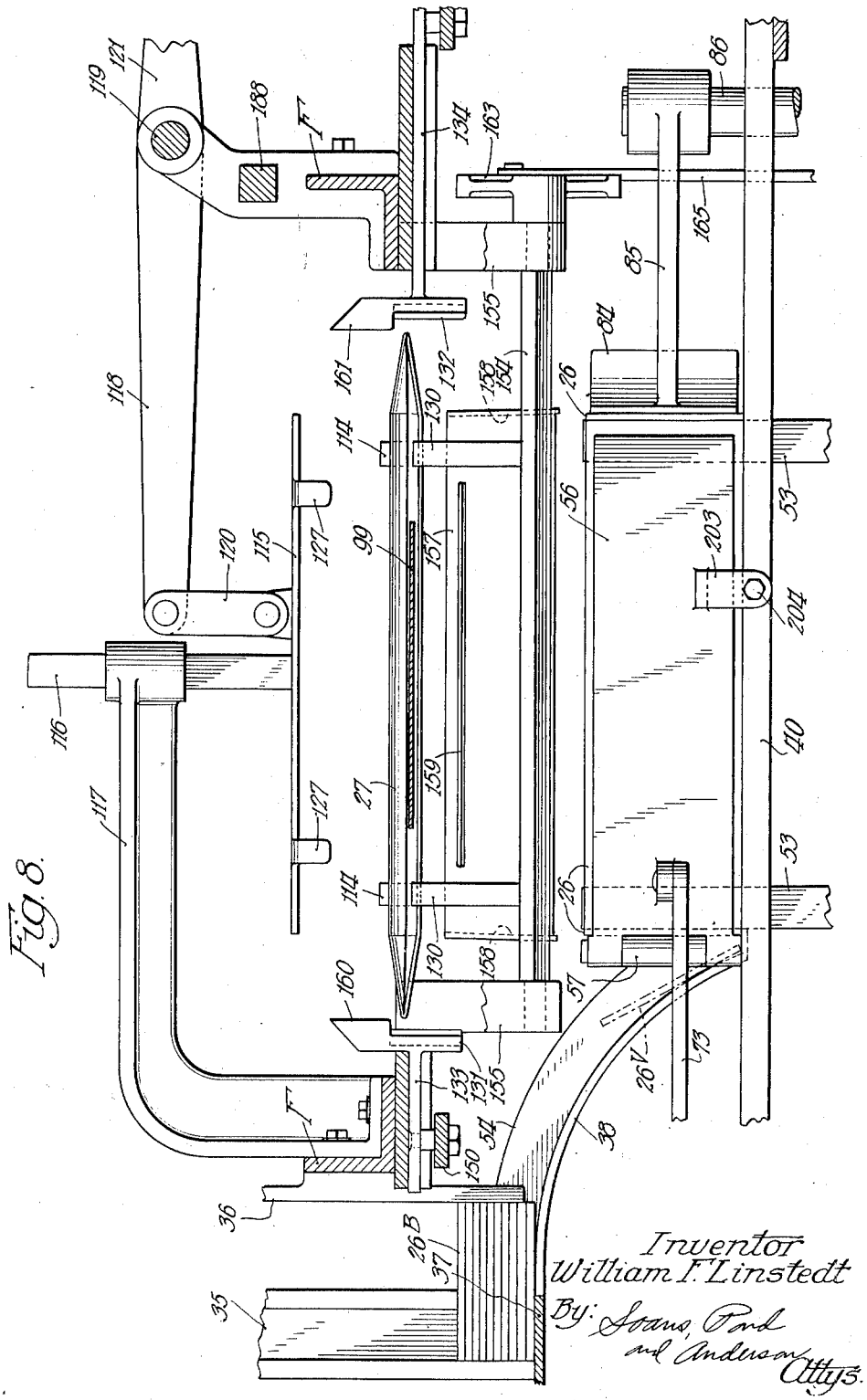

Jan. 8, 1952 W. F. LINSTEDT 2,581,491
APPARATUS FOR SETTING-UP BOXES
Filed Nov. 26, 1943 9 Sheets-Sheet 7
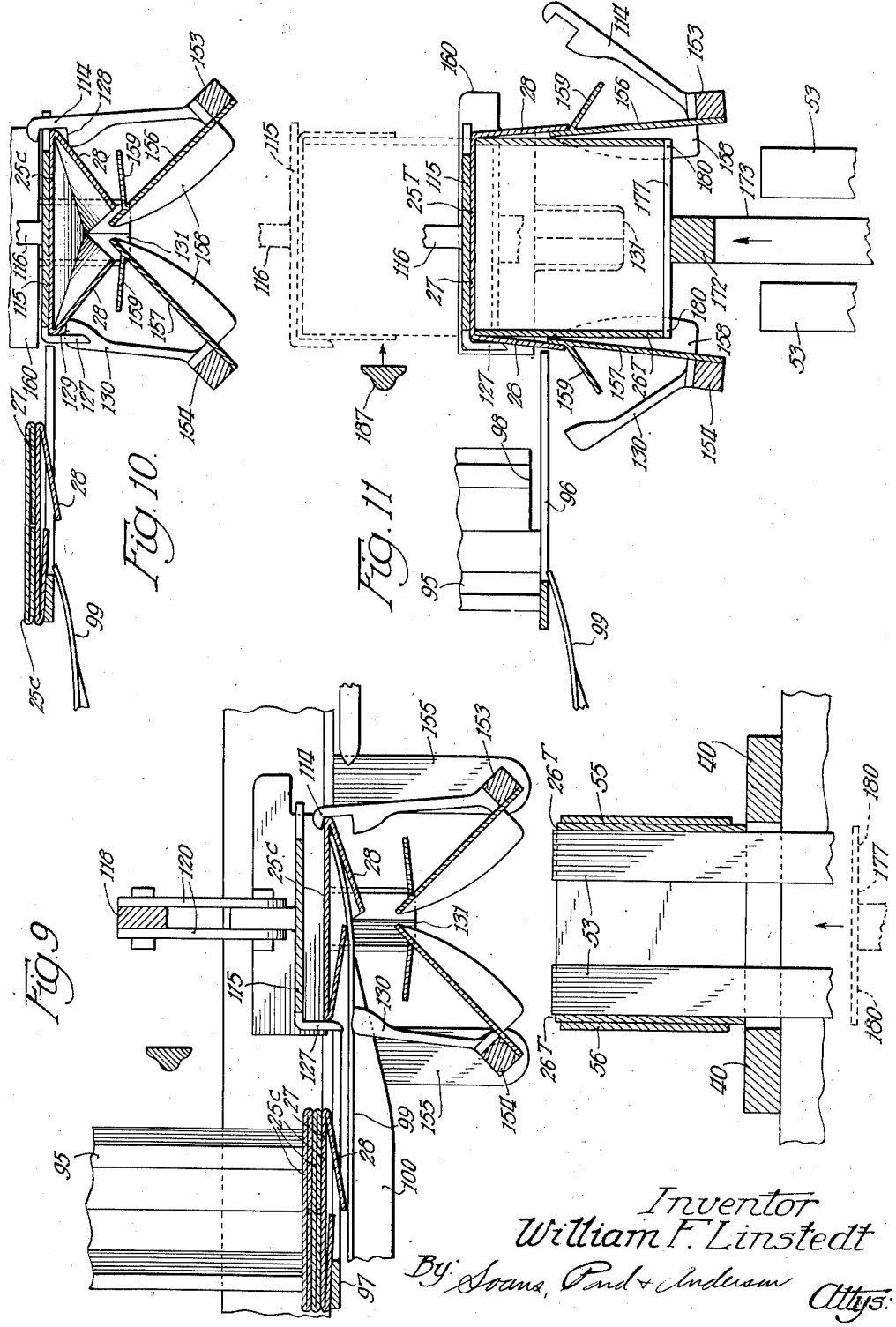
Inventor
William F. Linstedt
By Soans, Pond & Anderson
Attys.

Jan. 8, 1952 W. F. LINSTEDT 2,581,491
APPARATUS FOR SETTING-UP BOXES
Filed Nov. 26, 1943 9 Sheets-Sheet 8
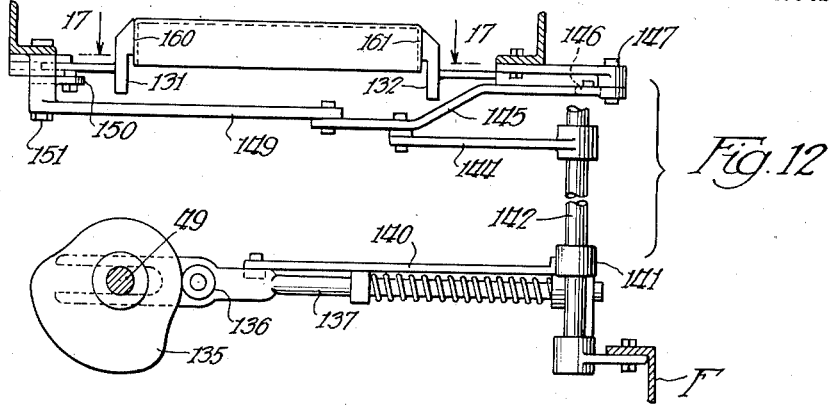
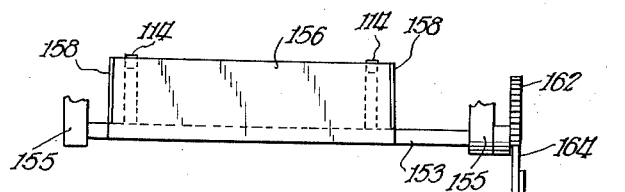
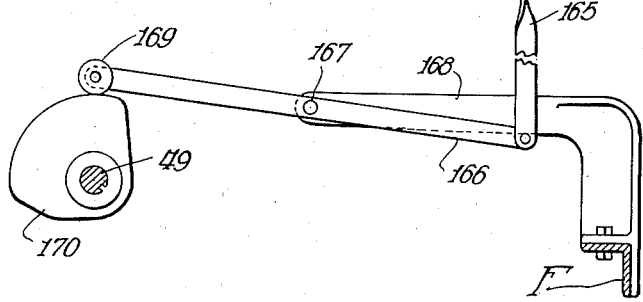
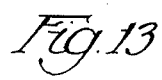
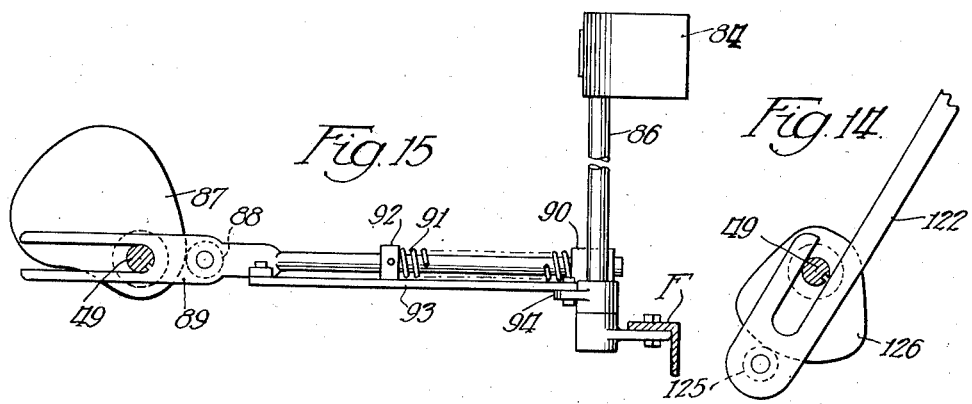
Inventor
William F. Linstedt
By: Soans, Pond & Anderson Attys.

Jan. 8, 1952      W. F. LINSTEDT      2,581,491
APPARATUS FOR SETTING-UP BOXES
Filed Nov. 26, 1943      9 Sheets-Sheet 9
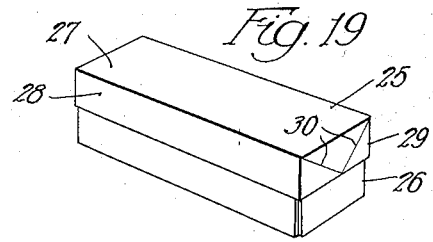
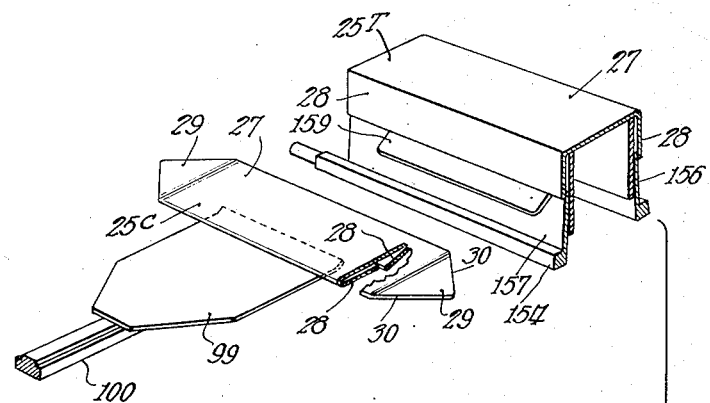
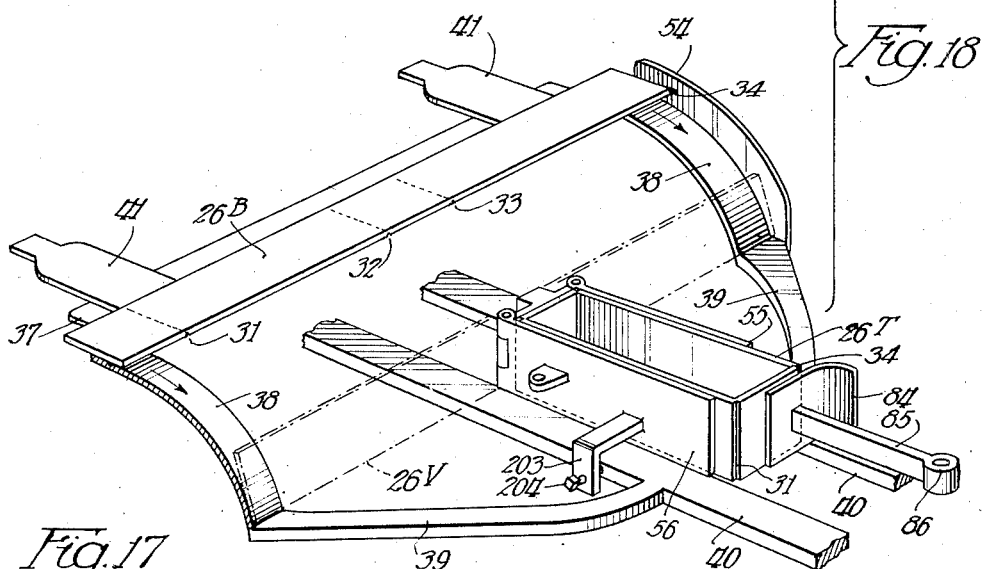
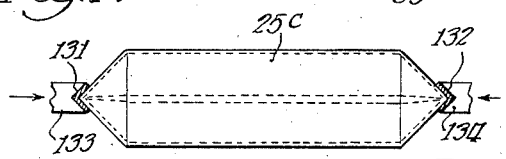
Inventor
William F. Linstedt
By Soans, Pond + Anderson Attys.

Patented Jan. 8, 1952

2,581,491

UNITED STATES PATENT OFFICE 2,581,491

APPARATUS FOR SETTING UP BOXES

William F. Linstedt, Freeport, Ill., assignor to Kraft Foods Company, a corporation of Delaware Application November 26, 1943, Serial No. 511,811

6 Claims. (Cl. 93—39)

1

This invention relates to an improvement in apparatus for setting up boxes, and it has particular reference to apparatus for setting up and assembling a foldable paper box structure, comprising a prefabricated and collapsed tray, and a prefabricated side wall structure. The side wall structure consists of an elongated paper board, or similar material strip, the width of which corresponds to the inside depth of the box to be formed, and the length of the strip is equal to the sum of the length of the two ends and two sides of the box. The strip is also preferably provided with suitable scores or fold lines to facilitate folding of the strip at predetermined places to form the same into a tubular box wall structure, in which condition it may be inserted into the open or unfolded tray.

The main objects of the invention are to provide a simple but efficient and durable apparatus for folding of box wall forming strips into tubular box wall form; to provide apparatus for opening or unfolding prefabricated tray elements; to provide means for inserting the tubular box wall element into the unfolded tray; and to provide means for feeding the assembled wall and tray elements to other apparatus for performing other operations on the box.

Other objects and advantages of the invention will be understood by reference to the following specification and accompanying drawings (9 sheets) wherein there is disclosed a selected form of apparatus for accomplishing the above stated objects.

Figure 1:
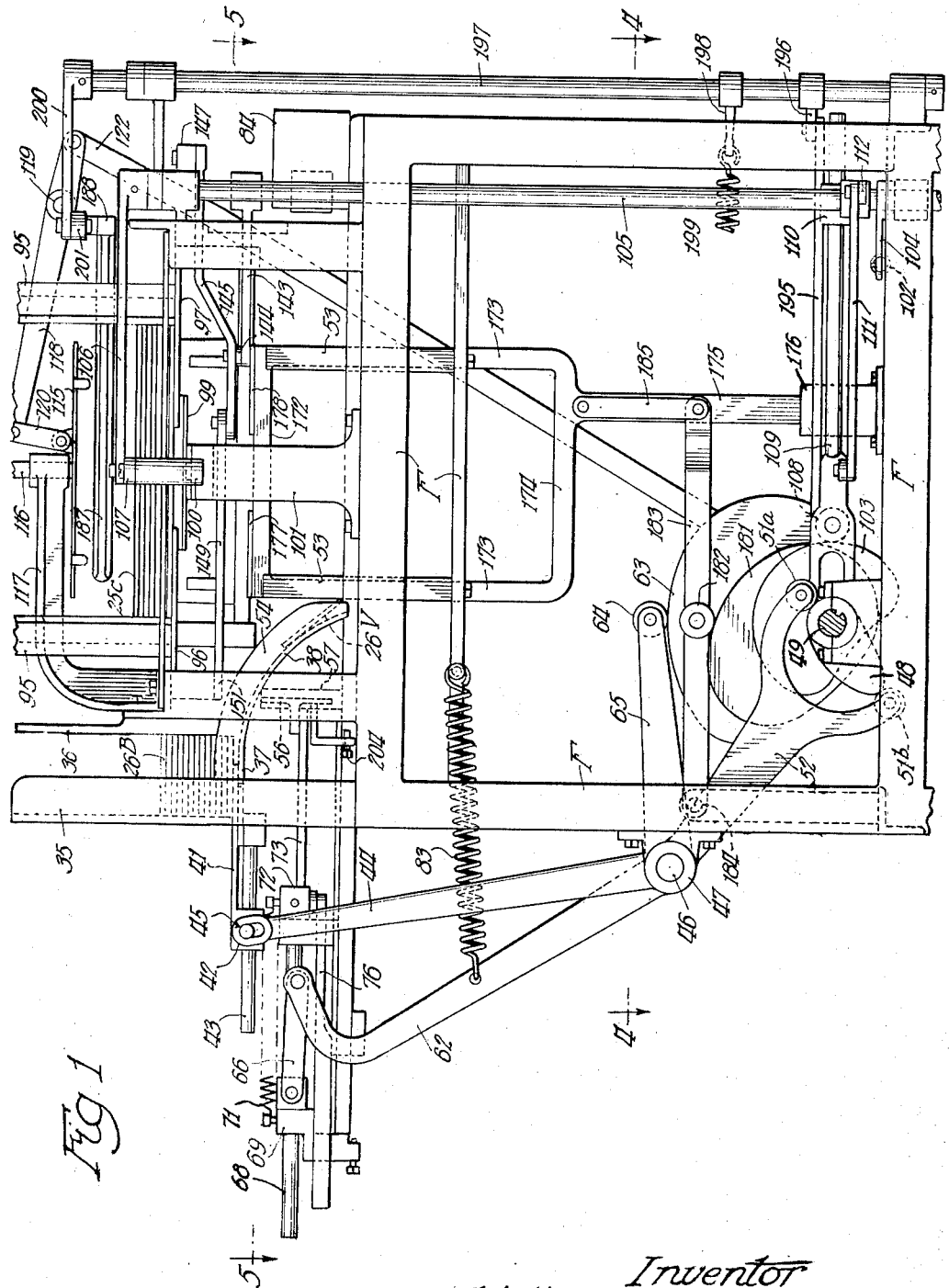
Figure 2:
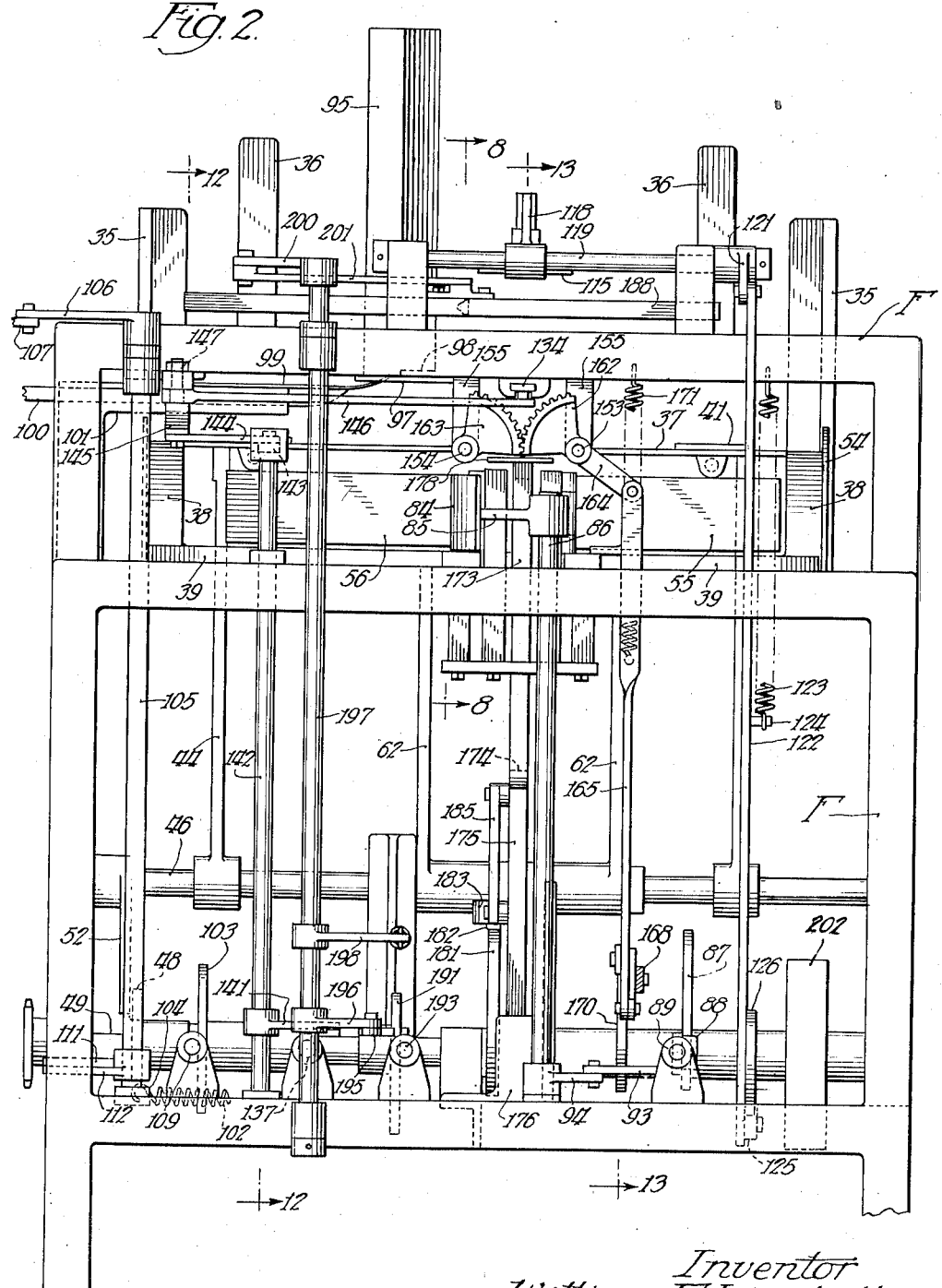
Figure 3:
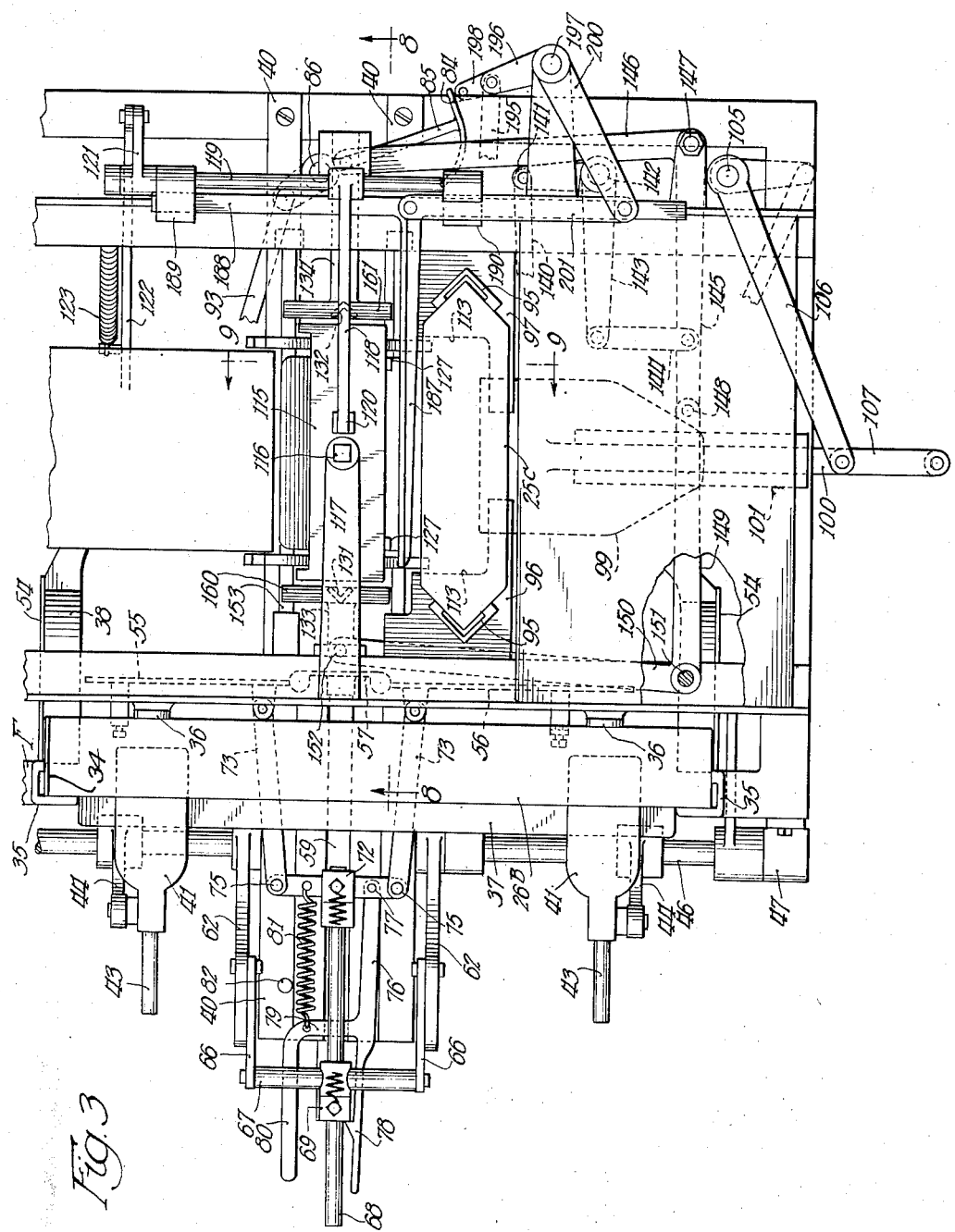
Figure 4:
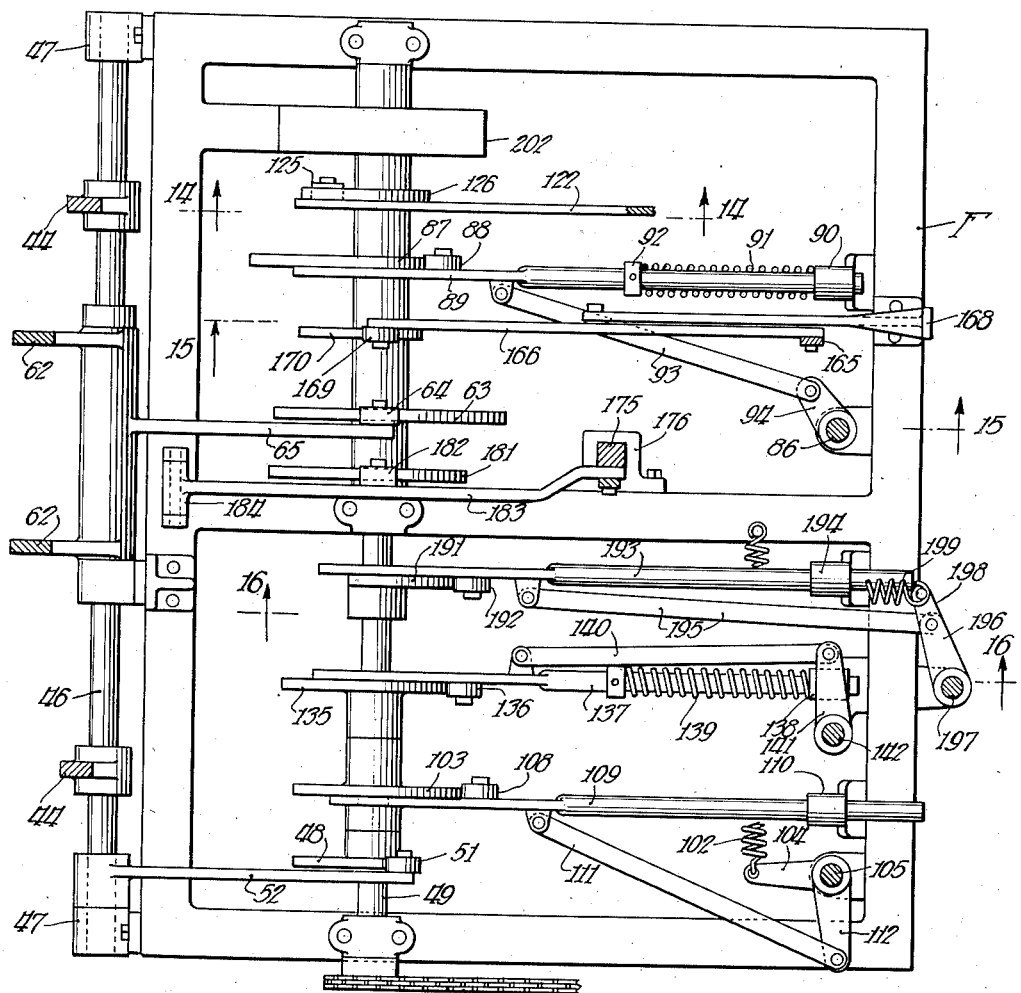
Figure 16:
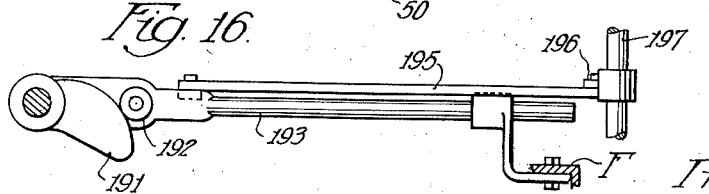

In the drawings, Fig. 1 is an end elevation; Fig. 2 is a side elevation looking at the right-hand side of the apparatus as illustrated in Fig. 1; Fig. 3 is a plan; Fig. 4 is a section on the line 4—4 of Fig. 1; Fig. 5 is a section on the line 5—5 of Fig. 1; Figs. 6 and 7 are sections respectively on the lines 6—6 and 7—7 of Fig. 5; Fig. 8 is a section on the line 8—8 of Figs. 2 and 3; Fig. 9 is a section on the line 9—9 of Fig. 3; Figs. 10 and 11 are sections corresponding to Fig. 9, but showing changed positions of the parts illustrated; Figs. 12 and 13 are sections respectively on the lines 12—12 and 13—13 of Fig. 2; Figs. 14, 15 and 16 are sections respectively on the lines 14—14, 15—15 and 16—16 of Fig. 4; Fig. 17 is a fragmentary section on the line 17—17 of Fig. 12; Fig. 18 is a fragmentary perspective illustrating certain details and principles of operation, and Fig. 19 is a perspective illustrating the completed box structure delivered by the apparatus.

The box structure assembled by the illustrated apparatus is best shown in Figs. 18 and 19. It consists of a tray 25 and a tubular side wall element 26. The tray 25 is prefabricated to a collapsed condition in which it is illustrated in Fig. 18 at 25-C. As there indicated, the collapsed tray comprises a bottom wall 27 (the box is assembled in inverted position so that the wall 27 ultimately becomes the bottom of the box), side wall flanges 28—28 folded inwardly under the bottom wall 27, and end walls 29—29, which are folded along diagonal lines 30, incident to outward folding of the end walls, and inward folding of the side walls. By the apparatus about to be described, the collapsed tray 25-C is opened up or unfolded, to form it into an inverted tray, as represented at 25-T in Figure 18.

The tubular side wall element 26 is delivered to the apparatus in the form of an elongated strip or blank 26-B (Fig. 18) provided with fold lines 31, 32 and 33, extending across the width of the blank. In one commercial embodiment of a container of the character illustrated, the wall body blank 26-B is formed of paper board approximately ⅛" thick. In that instance, the fold lines 32 are formed by slitting slightly more than half way through the thickness of the blank. Any suitable form of folding lines may, of course, be employed. At one end of the blank 26-B, there may be provided a recess to form a shoulder 34 against which to seat the opposite end of the blank when folded into tubular form, but this particular corner formation is without importance so far as the function and operation of the disclosed apparatus is concerned.

When the elongated blank 26-B is folded into tubular form, as indicated at 26-T (Figure 18) it is next inserted into the distended tray 25-T to form the inverted box structure shown in Fig. 19. The apparatus comprises a main frame structure, the various parts of which are designated F, upon which the various operating mechanisms are mounted. As shown in Fig. 1, there is provided a rack or hopper for supporting a stack of horizontally disposed side wall blanks 26-B. The rack comprises angle iron-like corner members 35 and forward guide or stop members 36 (see also Fig. 3). The blanks 26-B are maintained in stacked relation by said guide members, the lowermost blank being supported by a normally stationary plate member 37. The plate 37 is rigidly secured to the corner members 35—35, and it may also be supported by attachment to the upper ends of a pair of arcuate guides 38—38, which extend upwardly from the arms 39—39 which branch outwardly from a pair of cross members 40—40. The cross members 40—40 are mounted on conveniently accessible frame portions, as will be understood by reference to Figs. 3 and 5.

The lowermost blank 26-B in the stack is fed from the bottom of the stack along the arcuate guides 38 to a more or less vertically disposed position preparatory to the operation of mechanism for folding the blank to the tubular form explained. The blank-feeding mechanism comprises a pair of feeder plates 41, each of which embodies a bearing portion 42 slidably mounted on a normally fixed guide rod 43, which extends rearwardly, or outwardly, from the bottom of the plate 37. The feeder plates 41 are reciprocated by means of a pair of arms 44, which have their upper ends respectively connected to the feeder plates by suitable means such as pin and slot connections, such as indicated at 45 in Fig. 1. The lower ends of the arms 44 are keyed or pinned to a shaft 46, which is journalled in suitable bearings such as 47, carried by conveniently accessible frame parts F.

The shaft 46 is rocked by means of a cam 48, carried by a cam shaft 49, suitably journalled in bearings carried by the supporting frame, as shown in Fig. 4. The cam shaft 49 is continuously rotated by suitable driving connection indicated at 50, to a source of power which is not illustrated. The cam 48 acts on the rollers 51-A and 51-B, respectively, carried by the forked end of the lever 52, the other end of which is secured to the rock shaft 46. The cam is so shaped that it does not maintain constant operative engagement with both of the rollers 51-A and 51-B; it is so shaped that inward and outward movement of the blank feeding plates 41 will be positively effected, the cam acting against the roller 51-A to effect outward movement, or retraction of the feeder plates 41, and against the roller 51-B to effect forward, or feeding movement of the said feeding plates 41. As indicated in Fig. 1, the cam also serves, by its short period of simultaneous engagement with both rollers 51-A and 51-B, to determine the inner and outer extremes of movement of the feeder plates 41. The cam 48 is, of course, properly shaped and timed to effect reciprocation of the feeder plates in the required timed relation to other operations, which will presently be described.

It will be seen that the feeder plates 41 are operative on their forward movement to engage the outermost edge of the lowermost blank 26-B, and to push it forwardly from under the stack of blanks. In Fig. 1, the feeder plates 41 are illustrated in an advance position, and the blank fed thereby is shown in its more or less vertical position at the lower ends of the arcuate guides 38. The blank, in its more or less vertical position, is designated 26-V. Upon outward movement of the feeder plates 41, the stack of blanks will, of course, be lowered to the extent of the thickness of one blank, so that upon the next forward movement of the feeder plates, they will engage the then bottom blank to feed it forwardly, as described.

The blank 26-V is next acted upon by devices which fold it around a stationary skeleton mandrel comprising upright corner posts 53 which constitute the four corners of the skeleton mandrel. The upright members 53 are fixedly mounted on a frame member F, or supporting bar carried by the frame member. The blank 26-V is initially delivered into the angular space formed between the curved guides 38, and the adjacent upright members 53, and the blank is accurately positioned longitudinally with respect to the upright members 53 by means of side flanges or guides 54 which extend upwardly from the curved guides 38.

After the blank 26-B is delivered to the position 26-V, as shown in broken lines in Figs. 1, 8 and 18, it is folded around the mandrel posts 53 into the tubular form indicated at 26-T in Fig. 18. The mechanism for effecting such folding comprises a pair of folder plates 55 and 56, respectively pivoted to the ends of a central plate or crosshead 57. The folder plates are thus carried by the central plate 57, which is, in turn, mounted on and carried by an upstanding ear portion 58 of a horizontally slidably mounted bar 59. The bar 59 is horizontally, slidably supported on a pair of bars 60 (see Figs. 6 and 7) which are suitably secured to the undersides of the cross or frame members 40—40. Longitudinally extending guides 61—61 are fixedly mounted on the said bars 60—60 to guide the longitudinal sliding movement of the member 59, and they are suitably formed, as best shown in Fig. 7, to provide flange-like portions overlapping the upper margins of the slidable member 59, to hold it down.

At the beginning of the blank folding operation, the folders 55 and 56, and the end plate 57 are in a retracted position, substantially as illustrated in Figs. 1 and 3, and the folders 55 and 56 are located in longitudinal alignment and in parallelism with the end plate 57. The folders are initially advanced in the aligned position illustrated (without effecting pivotal movement of the folders 55 and 56) until the blank 26-V is pressed by the central member 57, against the adjacent mandrel corner members 53. Such movement of the folders is effected by means of a pair of integrally connected rock arms 62 (see Figs. 1, 3, and 4) which are pivotally mounted at their lower ends on the shaft 46, and actuated by means of spring 83 connected to one of the arms 62 and a conveniently accessible frame portion as indicated in Fig. 1. The movement of the arms 62 is controlled by a cam 63, which acts against a roller 64, carried by an arm 65, which is also formed integrally with the arms 62, as best shown in Fig. 4. The upper ends of the arms 62 are connected by means of links 66 to a crosshead 67 which is pinned, or otherwise securely fastened to a longitudinal slidable shaft 68. The shaft 68 is slidably supported in bearing posts 69 and 70, formed integrally with the slide 59. Motion is transmitted from the slidable shaft 68 to the slide 59 and thence to the folders by means of a tension spring 71, which is connected at one end to a fitting 72, secured to the forward end of the shaft 68, and at its other end, to the upper end of the bearing post 69, as best shown in Fig. 6. The spring 71 is of such strength that during the initial movement of the folder plates, the spring will resist stretching so that the shaft 68 will not advance relative to the slide 59, but will move in unison therewith. However, it will be observed that when the blank is pressed against the mandrel members 53 and further advance movement of the slidable member 59 thereby prevented, the rock arms 62 may continue their forward movement so as to effect movement of the shaft 68 relative to the member 59. During such continued movement of the rock arms 62, the spring 71 will, of course, be stretched.

The movement of the slidable shaft 68 relative to the member 59, serves to effect pivotal movement of the folders 55 and 56, to fold portions of the body blank to form the elongated sides of the rectangular tube-like structure illustrated. Such pivotal movement of the folders is effected by means of links 73—73, each of which has its front end pivoted, as indicated at 74, to one of the folders, and its rear end pivotally connected as indicated at 75, to ears which extend laterally from the shaft-carried fitting 72.

It is preferred that locking means be provided for preventing premature yielding of the spring 71 and pivotal movement of the folders 55 and 56 relative to the central plate 57. For this purpose, there is provided a latch arm 76, which is pivoted as indicated at 77 on one of the lugs extending from the fitting 72. At its other end, said latch arm 76 is provided with a locking dog 78, which is adapted to engage behind a portion of the upstanding bearing post 69 of the slide member 59. Latch 76 is provided with a laterally extending arm portion 79, and with a rearwardly extending portion 80, which is approximately parallel to the main latch arm 76. A spring 81 connected between the latch arm portion 79 and one of the lugs of the end fitting 72, serves to normally urge the latch member 76 into locking position relative to the bearing post 69. To release the latch at about the time that the central plate 57 presses the body blank against the mandrel posts 53, there is provided a fixed pin 82, which projects upwardly from one of the frame members 40 in such a position that it will engage the leading, curved end of the latch arm portion 80, to deflect the same in such a manner as to disengage the locking dog 78 from the bearing post 69.

The folder plates 55 and 56 are provided with laterally outwardly extending ears 203, which carry adjustable stop screws 204. The stop screws 204 are so arranged as to engage the outer edges of the frame members 40, to limit the blank folding movement of the folders 55 and 56. By this means, unnecessary inward bending of the side wall portions of the body blank will be relieved of excessive inwardly directed pressure.

It will be seen that the mechanism thus far described is operative to fold the blank 26–B into U-shaped form about the mandrel corner posts. There remains to be folded, the end portion of the blank between the fold line 31 of the blank and the adjacent end thereof, to complete the folding of the blank into tubular form.

The folding of the blank end portion is effected by means of a folder plate 84, which is carried by one end of a pivoted arm 85. The arm 85 is pivoted on a vertical pivot as indicated at 86, the said pivot 86 comprising a vertically disposed shaft mounted in suitable bearings, carried by the frame of the mechanism. The shaft 86 (and hence the folder 84) is rocked in properly timed relation to the previously described folding operations, by means of a spring and cam mechanism. In this instance, the cam comprises a disc cam 87 carried by the cam shaft 49, and a cam following roller 88 carried by a rod 89. The rod 89 has one end forked to embrace the cam shaft 49 and its other end slidably mounted in a bearing bracket 90, carried by an adjacent part of the frame F. A compression spring 91 placed around a part of the rod 89 and between its bearing 90 and a collar 92 secured to the rod, serves to normally hold the follower 88 in operative engagement with the cam. Movement of the rod 89 is transmitted through a link 93 to a crank arm 94, which is secured to the vertical shaft 86 (see Fig. 4).

The end folder 84 is illustrated in its starting position in Figs. 1, 2 and 3, and in the other extreme of its movement in Figs. 5, 8 and 18.

The cams which control the operations of the folding members for folding the blank 26–B into the body tube 26–T are so designed that they will remain in their advanced positions for a short interval, to thereby hold the blank in the form of a tube while it is ejected in an upward direction from within the folder plates. Upon being ejected upwardly, the tubular body enters an inverted opened, or unfolded, tray, as already explained. The mechanism for feeding and distending the trays will now be described.

The collapsed trays are delivered to the machine in stacks, and the stack is placed in vertical position in a hopper or rack comprising a pair of vertically disposed angle iron-like members 95—95. The members 95 extend upwardly from suitable table plates 96 and 97 (see Fig. 1), which are suitably mounted on stationary frame parts or brackets carried thereby. The angle members 95—95 co-operate with the pointed ends of the collapsed tray blanks to hold the same in vertically stacked position, the trays being arranged with their collapsed side walls folded under the bottom panel of the tray.

The lowermost collapsed tray 27 is fed laterally, with one of its long side edges as the leading edge, from underneath the stack and into the zone of operation of mechanism for distending such tray. As indicated at 98 (Fig. 2), the front wall of each angle member 95 is recessed to permit the lowermost tray to slide outwardly under said forward wall.

The means for advancing the lowermost tray 27 is best shown in Figs. 2, 3, 9 and 18. It comprises a pusher member 99 in the form of a resilient sheet metal plate. The member 99 is mounted on a horizontally movable bar 100, and the front end portion of said member is preferably curved upwardly, as shown. The bar or rod 100 is horizontally, slidably mounted in a suitable supporting bracket 101, which is fixedly mounted on the frame of the apparatus. Reciprocating movement is imparted to and controlled by a spring 102 and a cam 103, the cam 103 being secured to the cam shaft 49. The spring 102 has one end connected to a fixed frame part or the like, and its other end connected to an arm 104, which is secured to a vertically disposed shaft 105. The shaft 105 is rotatably mounted in and supported by suitable bearings carried by the frame of the apparatus, and the upper end of said shaft 105 has secured to it an arm 106, which is connected by a short link 107 to the outer, or rear, end of the rod or bar 100. The spring 102 supplies the force for advancing the rod 100 and the pusher 99, and the cam 103 acts to retract the pusher. The cam acts through a cam follower 108, carried by a rod 109, which has one end forked to embrace the cam shaft 49 for guidance thereby, and its other end slidably mounted in a bearing 110 carried by the framework of the apparatus. The rod 109 is connected by means of a link 111 to an arm 112, which is secured to the shaft 105, so that upon movement of the cam follower 108 away from the center of rotation of the cam 103, the shaft 105 will be rocked in the proper direction for retracting the tray feeding pusher 99.

As best shown in Figs. 9 and 10, the tray feeding pusher 99 is so arranged that its leading end will enter between the bottom panel 27, and the forward side wall 28 of the tray, and engage the same in the corner formed by the said parts. The upwardly curved leading end portion of the pusher 99, together with the normal tendency of the collapsed tray sides to spring open, substantially as indicated in the drawings, facilitate the entrance of the pusher into the tray corner area indicated. To permit the leading side wall 28 of the tray to spring open, as shown in Figs. 9 and 10, the supporting plates 96 and 97 are cut away, as indicated at 113, so that the side walls are supported only at very short end portions thereof.

In Fig. 9, the tray feeding member 99 is illustrated in its most advanced position in which it has delivered one of the collapsed trays into position against a pair of hook-like stop members 114 (see also Fig. 8). The hook-like formation of said stop members serves to prevent the forward edge of the tray 25-C from sliding upwardly, until such time as a vertical movable presser plate, or holding member, is lowered into operative relation to the tray delivered into position against the stops 114. The feeding member 99 is retracted very quickly after having completed its operative movement, and the above mentioned presser plate, or holding member, is lowered together with means for holding the tray against rearward movement with the feed member 99.

The vertically movable presser plate, or holding member, comprises a plate 115 which is vertically, slidably mounted by means of a post 116 extending upwardly from the plate, and a suitable bearing in a bracket arm 117, which slidably receives said post. Vertical movement of the presser plate 115 is effected through a rock arm 118, pivotally mounted intermediate its ends on a shaft 119, and connected at one end by means of a link 120 to the presser plate. The arm 118 is secured to the shaft 119, which is suitably journalled in the bearing brackets carried by the frame structure. Another arm 121 is secured to said shaft 119, and is connected by means of a long link 122 to spring and cam means for rocking said shaft 119, to thereby effect the vertical movement of the presser plate 115. As best shown in Figs. 2 and 14, a tension spring 123 is stretched between a fixed part of the frame structure and a pin 124 secured to the link 122. Said spring normally tends to effect upward movement of the link 122, and downward movement of the presser plate 115. The lower end of the link 122 is provided with a bifurcated portion which straddles the cam shaft 49 for guidance purposes, and the lower end of the link is provided with a roller 125, which engages the periphery of a rotary cam 126, carried by said cam shaft 49. The cam serves to effect downward movement of the link 122 and upward movement of the presser plate 115.

The presser plate 115 is provided at its rear edge with a pair of depending fingers or ears 127 (Figs. 3, 9 and 10) which engage the rear edge of the advanced tray to prevent such tray from following the feed member 99 in its rearward movement.

As soon as the feed member 99 is fully retracted (to the position shown in Fig. 10), the tray automatically opens up to a limited extent, substantially as illustrated in Fig. 10, due to the inherent resiliency of the paper board material of which the tray is made. The tray is initially held against downward movement from the presser plate 115 by means of an upwardly facing shoulder 128 on the hooked members 114, and by the upper end 129 of a member 130 located at the rear of the collapsed carton, and substantially corresponding to the hooked member 114, except that the hook-forming portion above the shoulder 128 is omitted.

Unfolding, or opening, of the tray is effected mainly by the provision of means for applying inwardly directed pressure against the end portions of the collapsed tray. Such means is best shown in Figs. 3, 8 and 9. It consists of a pair of horizontally, slidably mounted, angle members 131 and 132, which are respectively secured to the inner ends of suitable bars 133 and 134. The bars 133 and 134 are suitably, slidably mounted in ways provided in the frame structure F, or in proper brackets provided for that purpose. The angle members 131 and 132 are moved towards each other, into engagement with the respectively adjacent pointed ends of the collapsed tray, and their movement is continued inwardly until the folded ends of the trays and the folded sides of the trays are substantially fully unfolded to a perpendicular position relative to the bottom wall of the inverted tray.

The inward movement of the squeeze members 131 and 132 is effected and controlled by suitable spring and cam operating mechanism. As herein shown, such operating mechanism comprises a cam 135 carried by the cam shaft 49, and a cam follower 136 carried by a rod 137, which has one end forked to embrace a portion of the cam shaft 49 for guiding purposes, and its other end slidably mounted in a suitable bearing 138 carried by the frame of the apparatus. A suitable compression spring 139, disposed around a portion of the rod 137 may be provided for resisting outward movement of the rod 137 by the cam 135. Movement imparted to the rod 137 by the cam 135 and by the spring 139 is transmitted through a link 140 and an arm 141 to a vertically extending shaft 142, which is supported and journalled in suitable bearings carried by the frame. The upper end of the shaft 142 (see Figs. 2 and 3) has secured to it an arm 143, the outer end of which is, in turn, connected by a link 144 to an arm 145 of a bell crank lever, the other arm of which is shown at 146. The bell crank comprising the arms 145 and 146 is suitably, pivotally mounted as indicated at 147, for horizontal rocking movement. The free end of the bell crank arm 146 is connected by a suitable pin and slot connection to the slidable bar 134, which carries the squeezing angle 132. The free end of the bell crank arm 145 is pivotally connected, as shown at 148, to the adjacent end of another bell crank, comprising the arms 149 and 150, such other bell crank being pivotally mounted for horizontal rocking movement, as indicated at 151. The free end of the bell crank arm 150 is, in turn, operatively connected as shown at 152 to the slidable rod or bar 133, which carries the other squeezing angle 131. It will be seen that the cam 135 is operative to effect outward movement of the bars 133 and 134 and their respective squeezing heads 131 and 132, and that the spring 139 effects the operative, or squeezing movement, of said heads.

Because of the fact that the side and end walls of the tray are integrally connected, and because of the diagonal folding of the end walls in their collapsed condition, inward pressure directed against the folded ends of the tray will automatically effect opening, or unfolding, of the tray. Such unfolding is somewhat assisted by the mechanism which will now be described, and which serves the further purpose of facilitating insertion of the tubular body into the tray.

The pairs of tray-supporting fingers or members 114 and 130 are respectively carried by the bars 153 and 154, which are journalled at their ends in bearings provided in lugs or brackets, such as indicated at 155, which depend from adjacent frame or frames supported portions. Said bars also each carry plate or spade members 156 and 157, each of which have inturned end flanges 158. Near the upper ends of the spades 156 and 157, there are provided outwardly extending shelf members 159, the latter being rigidly secured to the respective spades.

At about the time that the squeezing members 131 and 132 begin their inward or operative movement, or shortly thereafter, the spades 156 and 157 are caused to rock upwardly and outwardly so that the upper end portions thereof enter between the adjacent free edges of the side walls 28 of the tray, and effect a spreading operation to thereby assist the opening thereof. The free edges of the tray sides 28—28 also engage the respective shelves 159 at the junction thereof with the spades, so that said edges of the tray may not move downwardly but instead must move upwardly as an incident to the upward and outward rocking movement of the spades. Such upward movement of the tray sides also necessitates upward movement of the tray bottom 27. Accordingly, the presser plate 115 is caused to move upwardly in conformity with the required upward movement of the tray. The upward movement of the presser plate 115 is controlled by the cam 126, which has hereinbefore been described, said cam being, of course, properly shaped to produce the required movement of the presser plate.

It will be seen by examination of Figs. 8 and 9 that the tray squeezing members 131 and 132 have upward extensions 160 and 161 respectively, which present substantially flat inner faces, offset inwardly somewhat from the innermost surfaces of the angle squeezing portions 131 and 132. During the movement of the tray upwardly, as above explained, the end wall portions adjacent the ends of the bottom will, of course, in effect, rock upwardly and come to rest against said flat inner surfaces 160 and 161, substantially as is indicated in Fig. 12. Hence, it will be seen that the final portion of the squeezing operation is effected, not by the angular squeezers 131 and 132, but by the flat upper portions 160 and 161 of the squeezing heads. Such flat surfaces 160 and 161 insure unfolding of the ends of the tray to substantially flat condition, which might not be true in the event that the spaced points of contact were employed, as would result from the use of angle pushers such as 131 and 132, for the entire unfolding operation.

Rocking movement is imparted to the rods or shafts 153 and 154 and the parts carried thereby, by mechanism best shown in Figs. 2, 8 and 13. As shown in these figures, the rods 154 and 153, at one end, have secured thereto intermeshing gear segments 162 and 163 respectively. The gear segment 162 is provided with an arm 164 to which is connected one end of a link 165, the other end of which is connected to one end of a rock lever 166. The rock lever 166 is pivoted intermediate its ends, as shown at 167, on a suitable bracket 168, mounted on the frame, and the other end of said rock lever carries a cam following roller 169 which engages a rotary cam 170, carried by the cam shaft 49. A tension spring 171, connected to a part of the link 165, and a conveniently accessible frame portion, serves to impart upward movement to the link 165, so as to thereby maintain the cam follower 169 in operative engagement with the periphery of the cam 170. Upward movement of the link 165, under the influence of the spring 171, effects restoration of the spades 156 and 157 from their final outward, or spread position, as shown in Fig. 11, to their initial, or beginning position, as shown in Figs. 9 and 10. The cam serves to effect the operative movement of the spades, i. e. the movement thereof from the initial position, as shown in Figs. 9 and 10, to their open, or spread, position, as shown in Fig. 11.

As best shown in Fig. 11, the outermost position of the spades 156 and 157 is such that the side walls of the tray are distended slightly beyond their normal position relative to the bottom of the tray, thereby to facilitate insertion of the tubular side wall structure 26-T. It will also be observed by inspection of Fig. 11, that the said spades 156 and 157 constitute, in effect, a funnel for guiding the insertion of the side wall tube into the tray, the end flanges 158 of said spades serving also to guide the ends of the tube structure into the tray.

When the tray has been fully opened to the position shown in Fig. 11, or slightly before the full opened position is reached, upward movement of the side wall tube 26-T is initiated, and continued until the tube reaches the fully inserted position as shown in Fig. 11.

For the purpose of moving the side wall tube 26-T from its position around the mandrel corners 53, upwardly into the distended tray, there is provided an elevator comprising (see Figs. 1, 2, 5, 9 and 11) a substantially rectangular frame embodying a top bar 172, side or end bars 173—173, depending from the ends of said top bar 172, and a bottom bar 174, connecting the lower ends of said bars 173. The side members 173—173 may be vertically slidably mounted in suitable guides carried by the respectively adjacent pairs of corners posts 53 of the skeleton mandrel, and further, by means of a post 175 depending from the bottom member 174, and vertically slidably mounted in a socket 176 mounted on the frame of the apparatus. On the top bar 172, there are mounted pusher plates 177 and 178, said plates being appropriately shaped to provide end portions 179 and side portions 180, which extend beneath the edges of the side wall tube when formed around the mandrel posts 53 (see particularly Fig. 5).

Upward movement of the elevator structure just described, is effected by means of a cam 181 carried by the cam shaft 49. Said cam acts against a roller 182, carried by a rock lever 183, which is pivoted at one end as shown at 184, on a conveniently located part of the frame, and has its other end connected through a link 185 to a portion of the elevator post 175. The cam 181 is, of course, appropriately shaped to effect the required upward movement of the elevator plates 177 and 178, to force the tube structure 26-T upwardly from the mandrel posts 53, between the opened spades 156 and 157, and into the distended tray 25-T, as shown in Fig. 11. The upward movement of the elevator structure is continued, together with corresponding upward movement of the presser plate 115, to completely eject the tray with its inserted side wall structure from the spades 156 and 157. The lowermost edge of the ejected tray and side wall structure will be located at 186 (Fig. 11) so that only a narrow lower portion of the tubular wall structure remains between the flat upper portions 160 and 161 of the squeezing heads, which may then constitute guides for subsequent lateral movement of the tray with its inserted side wall structure, by which it is delivered to a conveyor for movement to mechanism for inverting the structure, and filling it with material to be packaged for other operations.

Lateral movement of the elevated tray and inserted side wall structure, from the position illustrated in dotted lines in Fig. 11, is effected by means of a feed bar, or pusher 187 (see Figs. 1, 2, 3 and 11). The pusher 187 extends laterally from a bar, or rod 188, which is horizontally, longitudinally slidably mounted in suitable guides or brackets 189 and 190, which extend upwardly from adjacent frame portions. The guides for the bar 188 may be formed in the same post which provides bearings for the shaft 119.

Reciprocating movement is imparted to the bar 188 and the pusher 187 in properly timed relation to the other operations of the mechanism, by a cam 191 (see Fig. 4) carried by the cam shaft 49. Said cam acts against a roller 192, carried by a bar 193, which has one end forked to embrace the cam shaft 45 for support and guidance thereby, and its other end slidably mounted in a bearing 194 carried by the frame structure. The cam actuated bar 193 is connected by a link 195 to an arm 196, which is secured to a vertically disposed shaft 197, mounted for rocking movement in suitable bearings extending from portions of the frame. Another arm 198 is secured to said shaft 197, and has connected to its free end a tension spring 199, the other end of which spring is suitably anchored to a relatively stationary part of the mechanism. The spring 199 serves to yieldingly hold the cam follower 192 in engagement with the periphery of the cam 191. At the upper end of the shaft 197, there is secured a rock arm 200, the free end of which is connected by means of a link 201 to the slide bar 188.

It will be seen that the cam 191 will be operative through the described connections to the pusher bar 187—188, to effect forward, or feeding movement of the bar 187, and that the spring 199 will insure return movement of the parts as permitted by the cam. The extent of feed movement imparted to the feed bar 187 may, of course, be made to suit the required conditions of the installation of the apparatus.

In order to prevent the various spring forces which act against the cams carried by the cam shaft 49, from effecting turning movement of the cams and shaft, and to cause the apparatus to remain stationary in any position which may be desired for adjusting, or other purposes, a brake of any suitable construction may be applied to the cam shaft. Such a brake is represented at 202 in Figs. 2 and 4. The brake may be of a type to exert a constant holding force on the shaft, or it may be an adjustable brake which may be manually, or otherwise applied when the power for operating the machine is shut off.

Various changes in the described structure may be made while retaining the general features and principles involved, wherefore the scope of the invention should not be considered limited to the specific details of apparatus disclosed, but should be determined by reference to the following claims.

I claim:

1. Box making apparatus of the class described, comprising a vertically disposed mandrel, means for delivering a box section blank into a vertical position adjacent a portion of said mandrel, means embodying a slidable member and a transverse end plate for pressing an intermediate portion of said box blank into engagement with the adjacent portion of said mandrel, folding plates hingeably connected to the opposite sides of said end plate for folding opposite portions of said blank over the opposite sides of said mandrel, means for actuating said folders comprising an element slidably mounted on said slidable member for movement relative thereto, links connecting said folders to said slidable element, means for imparting movement to said slidable element, spring means connecting said slidable element and said slidable member so as to initially transmit the movement imparted to said element to said member and end plate, whereby said member and end plate are advanced to press the blank against the mandrel and said spring means serves to permit continuation of the movement of said element independent of movement of said member, to thereby actuate said folders after the blank is pressed against the mandrel.

2. Box making apparatus of the class described, comprising a vertically disposed mandrel, means for delivering a box section blank into a vertical position adjacent a portion of said mandrel, means embodying a slidable member and a transverse end plate for pressing an intermediate portion of said box blank into engagement with the adjacent portion of said mandrel, folding plates hingeably connected to the opposite sides of said end plate for folding opposite portions of said blank over the opposite sides of said mandrel, means for actuating said folders comprising an element slidably mounted on said slidable member for movement relative thereto, links connecting said folders to said slidable element, means for imparting movement to said slidable element, spring means connecting said slidable element and said slidable member so as to initially transmit the movement imparted to said element to said member and end plate, whereby said member and end plate are advanced to press the blank against the mandrel and said spring means serves to permit continuation of the movement of said element independent of movement of said member and end plate to thereby actuate said folders after the blank is pressed against the mandrel, means for locking said element to said member during the initial, simultaneous movement of said element and said member, and means for automatically disengaging said locking means when said member and its cross plate reach a predetermined position relative to the box blank and mandrel.

3. In apparatus of the class described, a vertically disposed skeleton mandrel embodying corner posts defining the inside area of a box section, means for folding a box section blank horizontally around said mandrel posts to form a tubular wall section, means disposed above said mandrel for receiving and unfolding, or opening, an inverted collapsed paper board tray which embodies a bottom wall, side and end walls foldably connected to the side and end edges of the bottom wall, one opposed pair of said walls being folded inwardly under the bottom of the section and the other pair of said walls being folded outwardly into approximately co-planar relation to said bottom and inwardly folded wall portions, the outwardly folded portions being also refolded upon themselves in continuation of the inward folding of the other wall portions, and elevator means operable within said skeleton mandrel and having portions underlying the lower edges of said tubular wall section, so as to be engageable therewith upon upward movement of said elevator means, and means for effecting upward movement of said elevating means to thereby elevate said tubular wall section into assembled, telescopically interfitting relation to said inverted and unfolded tray.

4. Box making apparatus of the class described, comprising a magazine for supporting a stack of horizontally disposed box blanks, a normally stationary, vertically extending mandrel, blank feeding and guiding means for conducting said blanks in horizontal position and delivering the same to said mandrel in an upright, on-edge position, and means for folding the delivered blank horizontally around said mandrel.

5. Box making apparatus of the class described, comprising means for supporting a box section blank in a substantially horizontal plane, guide means extending horizontally from said supporting means, said guide means having a downwardly turned delivery end portion, means for feeding the blank along said guide from its horizontally supported position to said downturned delivery end portion, thereby to turn said blank from its initial horizontal position to a more or less upright, on-edge position, means for stopping the downward movement of said blank on said downturned guide portion, and a normally stationary, vertically disposed mandrel adjacent the position of the stopped, upright blank, and means for pressing the blank against said mandrel and folding portions of the blank horizontally around said mandrel to form the blank into a box section.

6. Box making apparatus of the class described, comprising a normally vertically disposed mandrel, means for initially positioning an elongated box blank in an on-edge position with the length of the blank extending horizontally and a portion of the blank intermediate its ends disposed adjacent a part of said mandrel, blank supporting arms extending horizontally from points adjacent the ends of a blank on said positioning means to points adjacent parts of said mandrel which are remote from said blank positioning means, and means for pressing said intermediate portion of the blank against the adjacent portion of said mandrel and for folding the opposite end portions of the blank around the mandrel, said supporting arms serving to support the end portions of the blank during said folding thereof.

WILLIAM F. LINSTEDT.

REFERENCES CITED

The following references are of record in the file of this patent:

UNITED STATES PATENTS

| Number | Name | Date |
| --- | --- | --- |
| 566,823 | Van Vleet et al. | Sept. 1, 1896 |
| 639,354 | Butler | Dec. 19, 1899 |
| 836,399 | Oesterreich | Nov. 20, 1906 |
| 1,379,622 | Grupe | May 31, 1921 |
| 1,674,921 | Robinson | June 26, 1928 |
| 1,784,571 | Bergstein | Dec. 9, 1930 |
| 1,868,873 | Bergstein | July 26, 1932 |
| 1,995,455 | Jahne | Mar. 26, 1935 |
| 2,224,426 | Cullan et al. | Dec. 10, 1940 |
| 2,282,160 | Bischoff | May 5, 1942 |
| 2,433,701 | Linstedt | Dec. 30, 1947 |

FOREIGN PATENTS

| Number | Country | Date |
| --- | --- | --- |
| 329,322 | Germany | Nov. 20, 1920 |
| 322,989 | Great Britain | Dec. 19, 1929 |
| 495,613 | Germany | Apr. 15, 1930 |